3,040,077
PROCESS FOR THE PREPARATION OF CYCLOPENTADIENYLMANGANESE TRICARBONYLS

Donald C. Freeman, Jr., Grand Island, N.Y., assignor to Union Carbide Corporation, a corporation of New York
No Drawing. Filed Nov. 27, 1957, Ser. No. 699,161
23 Claims. (Cl. 260—429)

The present invention is an improved process for the preparation of cyclopentadienylmanganese tricarbonyl, $C_5H_5Mn(CO)_3$, and substituted cyclopentadienylmanganese tricarbonyls.

Heretofore one method (Z. Naturforsch, 9b, 618, 1954) that has been proposed for the preparation of cyclopentadienylmanganese tricarbonyl involves the reaction of bis-(cyclopentadienyl) manganese with carbon monoxide. Another method (J. Inorg. Nucl. Chem., 1, 165, 1955) involves the addition of manganous bromide to cyclopentadienylsodium in tetrahydrofuran to form bis(cyclopentadienyl) manganese, evaporation of the solvent, and reaction of the residue containing bis(cyclopentadienyl) manganese with carbon monoxide under pressure. Both of these processes result in low yields of product, 20% and 13.5% respectively, based on cyclopentadiene. In addition, polymeric by-products derived from cyclopentadiene are formed in both processes which render purification of the cyclopentadienylmanganese tricarbonyl extremely difficult. Another disadvantage of the prior processes is that a maximum of only 50% of the cyclopentadiene in the starting materials can appear in the desired product.

Cyclopentadienylmanganese tricarbonyl and substituted cyclopentadienylmanganese tricarbonyls can be used as anti-knock additives to motor fuels, either alone or in combination with other anti-knock additives such as tetraethyl lead.

The present invention has the advantage of providing an improved method for the production of cyclopentadienylmanganese tricarbonyls, suitable as anti-knock additives and other uses, which process is not subject to the disadvantages inherent in the prior processes as pointed out above.

In accordance with the present invention, a cyclopentadienylmanganese tricarbonyl is prepared by the reaction of a manganous halide of molecular weight greater than about 125 with an alkali metal, an alkali metal cyclopentadienide and carbon monoxide, the reaction being carried out in a suitable inert liquid organic solvent. The process may be represented by the equation:

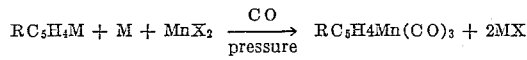

$$RC_5H_4M + M + MnX_2 \xrightarrow[\text{pressure}]{CO} RC_5H_4Mn(CO)_3 + 2MX$$

where R is hydrogen or an alkyl group, M is an alkali metal and X is a halogen having an atomic weight greater than about 35.

The detailed description of the invention which follows sets forth the improved method for making cyclopentadienylmanganese tricarbonyl by reacting a manganous halide of molecular weight greater than about 125 with sodium, cyclopentadienylsodium and carbon monoxide. It is understood, however, that other alkali metals such as lithium and potassium can be used in place of sodium. Sodium is preferred because of relative ease of handling and the higher yields of the desired product obtained. It is further understood that substituted cyclopentadienylmanganese tricarbonyls can be made by the process of the present invention as set forth in detail in examples hereinbelow.

The entire process is preferably carried out in the absence of oxidizing agents and moisture.

A dispersion of sodium in an inert liquid hydrocarbon, such as xylene, kerosene or mineral oil, may be prepared by agitating the molten metal at temperatures between 100° C. and 120° C. for 10 to 15 minutes in the solvent. The dispersion is then cooled to room temperature and slowly added to a solution of freshly distilled cyclopentadiene monomer in a suitable solvent, preferably in a ratio of about 1.25 to 2.0 moles of sodium per mole of cyclopentadiene, to form a mixture of sodium and cyclopentadienylsodium. The rate of addition is regulated to keep the temperature of the reaction mixture below about 30° C. This mixture is then stirred at room temperature for about 45 minutes to an hour to insure substantially complete reaction of the cyclopentadiene with the sodium.

The cyclopentadienylsodium-sodium mixture can be formed most conveniently as stated above, but alternatively the cyclopentadienylsodium may be prepared separately and combined with dispersed sodium, preferably in the ratio of 0.25 to 1.0 mole of sodium per mole of cyclopentadienylsodium.

Suitable solvents for the cyclopentadienylsodium-sodium mixture are lower dialkyl ethers, lower aliphatic cyclic ethers, and lower dialkyl ethers of lower alkylene and polyalkylene glycols. Tetrahydrofuran and ethylene glycol dimethyl ether are the solvents most preferred. Aromatic hydrocarbon solvents such as benzene and toluene are operable, but give low yields of cyclopentadienylmanganese tricarbonyl.

A manganous halide suspension may be prepared by the addition of finely divided, anhydrous manganous halide, preferably manganous chloride, to a suitable solvent with stirring. The solvent should be inert with respect to all reactants and products, except for etherate formation as described hereinbelow, and should be capable of maintaining the suspension without excessive stirring or agitation. Representative of such solvents are aromatic hydrocarbons, such as benzene, xylene and toluene; amines such as trimethyl amine, triethyl amine and tributyl amine; dialkyl monoethers such as dimethyl ether, diethyl ether and dipropyl ether; cyclic ethers such as tetrahydrofuran, pyran and dioxane; diethers of lower alkylene glycols such as the dimethyl ether of ethylene glycol, the dimethyl ether of trimethylene glycol and the dimethyl ether of 1,2-butylene glycol; and the diethers of polyalkylene glycols, such as the diethyl ether of diethylene glycol, the diethyl ether of triethylene glycol and the diethyl ether of dipropylene glycol.

In the preferred form of this invention, an ether which forms an adduct with the manganous halide is used as the solvent. Prior to the addition of the cyclopentadienyl-sodium-sodium mixture, the manganous halide, preferably the chloride, is suspended and solubilized by forming the manganous halide etherate. For example, the adduct $MnCl_2 \cdot C_4H_8O$ is formed from manganous chloride and tetrahydrofuran. Solvents which are suitable for forming manganous halide etherates are lower dialkyl monoethers, lower aliphatic cyclic ethers, and lower alkylene glycol lower dialkyl ethers such as the dimethyl, diethyl, dipropyl, and dibutyl ethers of polyalkylene and alkylene glycols. The highest and most easily recovered yields of product are obtained when tetrahydrofuran or ethylene glycol dimethyl ether is used as the etherate-forming solvent.

The manganous halide etherate is formed by the addition of finely divided, anhydrous manganous halide to the ether solvent with stirring. The formation of the etherate is accompanied by evolution of heat and a color change from the pink manganous halide to the white manganous halide etherate. The mixture may then be heated and stirred until the manganous halide is completely suspended in and complexed with the solvent. The time required for complete reaction varies depending on the dryness and degree of subdivision of the manganous halide.

The above-described method for forming the manganous halide etherate is direct and convenient. However, a manganous halide etherate formed by any method, such as reaction of manganese metal with a halogen of molecular weight greater than about 70 in the presence of an ether solvent, may be used satisfactorily in the process of the present invention. When formed from manganese metal and a halogen, the manganous halide etherate is frequently dark in color due to the presence of unreacted manganese.

To the manganous halide suspension or, preferably, to the manganous halide etherate suspension at about room temperature, is added a quantity of the cyclopentadienyl-sodium-sodium mixture. Preferably, the amount of cyclopentadienylsodium-sodium mixture added should be such that the reactants are in the ratio of between about 0.25 to about 1.0 mole of sodium per mole of cyclopentadienyl-sodium and between about 1 to about 1.75 moles of cyclopentadienyl-sodium per mole of manganous halide. The sum of the number of moles of excess sodium and the number of moles of cyclopentadienyl-sodium should equal about twice the number of moles of manganous halide. The addition of the cyclopentadienyl-sodium-sodium mixture is preferably carried out slowly with stirring at room temperature. The resulting mixture may then be heated to about 60° C. and stirred for about two hours. The mixture may then be pressurized with carbon monoxide to a value between about 15 p.s.i.g. and about 5000 p.s.i.g. and heated to between 50° C. and 250° C. for between one and eight hours or until carbon monoxide absorption substantially ceases. The preferred conditions are a carbon monoxide pressure of between 800 and 1500 p.s.i.g. at a temperature of between 150° C. and 175° C.; under these conditions the absorption of carbon monoxide will be found to cease after about 6 hours.

The highest yields of cyclopentadienyl manganese tricarbonyl are obtained by adding the mixture of sodium and cyclopentadienylsodium to the manganous halide or manganous halide etherate suspension. The filter cake obtained from the final reaction mixture is light colored, non-pyrophoric and contains little manganese metal. If the manganous halide is added to the cyclopentadienyl-sodium-sodium mixture, the filter cake obtained from the final reaction mixture is brown, pyrophoric, and contains up to 20% of the total manganese as manganese metal.

The reaction of the manganous halide and cyclopentadienylsodium-sodium mixture can be carried out conveniently in an autoclave or other suitable vessel which may be subsequently pressurized with carbon monoxide to approximately 1000 p.s.i.g. and slowly heated to about 160° C. The pressure usually increases to about 1400 p.s.i.g. as the temperature is increased. The pressure is then regulated at a value between about 800 and 1500 p.s.i.g.

After carbon monoxide absorption ceases, the reaction vessel is cooled to room temperature and residual gases are vented off. The final reaction mixture is a yellow slurry. The cyclopentadienylmanganese tricarbonyl can be isolated, purified, and stored by known procedures, care being exercised to prevent decomposition of the product by ultraviolet light.

An important advantage of the present invention is the use of sodium metal as a reducing agent in the formation of cyclopentadienylmanganese tricarbonyls. In the prior processes and in the present improved process the reduction of divalent manganese, as present in bis(cyclopentadienyl)-manganese or manganous halide, to monovalent manganese is a step in the formation of the cyclopentadienylmanganese tricarbonyl. In the prior processes and in the present improved process the reduction of divalent manganese, as present in bis(cyclopentadienyl)-manganese or manganous halide, to monovalent manganese is a step in the formation of the cyclopentadienylmanganese tricarbonyl. In the prior processes, one of the cyclopentadienyl groups of bis(cyclopentadienyl)manganese is required to act as the reducing agent. This has the disadvantage that only half of the costly cyclopentadiene in the starting material can appear in the desired product, and the cyclopentadienyl groups which function as reducing agents subsequently polymerize to give oily residues which interfere with recovery of the cyclopentadienylmanganese tricarbonyl produced. In the improved process of this invention, inexpensive sodium metal functions as an efficient reducing agent which does not form undesirable by-products. The use of sodium also eliminates the need for wasting the cyclopentadiene which acts as the reducing agent in the prior processes. This is an especially important factor in the production of substituted cyclopentadienylmanganese tricarbonyl where the substituted cyclopentadienes used as starting materials are relatively expensive.

A further important embodiment of the present invention is the addition of the cyclopentadienylsodium-sodium mixture to the manganous halide suspension. The manganous halide is thereby present in excess of the reducing agent and a smooth reduction to monovalent manganese, the valence state present in cyclopentadieneylmanganese tricarbonyl, can take place. If the manganous halide is added to the cyclopentadienylsodium-sodium mixture, the reducing agent is present in excess and much of the manganese is completely reduced to manganese metal. Manganese metal does not react subsequently to form cyclopentadienylmanganese tricarbonyl and the yield of the desired product is therefore reduced.

A still further important embodiment of the present invention is the preparation of the manganous halide etherate prior to addition of the cyclopentadienylsodium-sodium mixture. Complex formation of the manganous halide with the ether solvent gives a well dispersed and highly reactive form of the manganous halide. Also, the decomposition of the manganous halide etherate is an endothermic reaction, and much of the heat produced when the manganous halide is treated with the cyclopentadienylsodium-sodium mixture can be immediately absorbed in the decomposition of the halide etherate. This results in better temperature control and helps to eliminate undesirable side reactions caused by excessive heat evolution during the addition of the cyclopentadienylsodium-sodium mixture.

A still further important embodiment of this invention is the method used to form the manganous halide etherate. Manganous halide etherates are known in the art, but prior to this invention it was unknown that the complex could be formed directly with the ether. Prior processes for forming etherates involved the reaction of manganese metal and a halogen in an ether solvent. By the process of this invention, an anhydrous manganous halide prepared by any convenient method is added directly to an ether solvent, thoroughly mixed and heated if necessary, the halide changing from a granular, pink solid to a flocculant, milk white halide etherate suspension.

*Example I*

An atmosphere of inert gas was provided to exclude air and moisture. A total of 1260 g. (10.0 moles) of pink, granular anhydrous manganous chloride was added slowly to 1 gallon of ethylene glycol dimethyl ether in a 5-gallon separatory autoclave over 45 minutes with agitation. The mixture was warmed for another 2 hours with agitation and then cooled to room temperature. A flocculant milk white suspension of the manganous chloride etherate, $MnCl_2 \cdot C_4H_{10}O_2$, was formed which was employed as set forth below in the preparation of cyclopentadienylmanganese tricarbonyl.

A dispersion of sodium in xylene was prepared as follows: about 500 g. of xylene and about 4.5 g. of aluminum laurate (an aid in maintaining the dispersion) were placed in a 3-liter, 4-necked flask equipped with a stirrer, a thermometer and a stainless steel air-cooled condenser.

Four hundred sixty g. (20 moles) of sodium metal were added and dispersed in the xylene by stirring vigorously for 10 minutes at 110° C.

The dispersion was allowed to cool to room temperature and slowly added to a mixture of two gallons (7.5 liters) of dry ethylene glycol dimethyl ether and 1000 gm. (15.0 moles) of cyclopentadiene in a glass lined kettle. The addition was accomplished with a 2-liter separatory funnel and took about 1.5 hours. During the addition, the temperature was maintained at 20 to 25° C. After stirring for about one hour the resultant white slurry was discharged into a 4-gallon separatory funnel. It was then added slowly at room temperature to 1260 g. (10.0 moles) of $MnCl_2$ (complexed with ethylene glycol dimethyl ether as shown above) over a period of 45 minutes and stirred at 60° C. for two hours. The reaction mixture was then pressurized in a five-gallon autoclave to about 800 p.s.i.g. with carbon monoxide and gradually heated to 167° C. Carbon monoxide absorption continued for five hours; the pressure varied from about 800 p.s.i.g. to 1400 p.s.i.g. The autoclave was depressurized and the crude product removed and filtered under partial vacuum. By recrystallization, 1460 g. of bright yellow crystals identified as cyclopentadienylmanganese tricarbonyl were obtained. This represents a yield of 70% based on manganese and 47% of the cyclopentadiene appears in the final product.

*Example II*

Manganous bromide was prepared by the reaction of 11 g. of manganese in 100 ml. of ethylene glycol dimethyl ether with 32 g. of bromine, added dropwise, keeping the temperature between 50 and 70° C. The last two to three grams of bromine added did not react readily and the mixture was refluxed for approximately one hour. The product was a light reddish-brown insoluble powder. The mixture was cooled to approximately 10° C. and 12.0 g. of cyclopentadiene were added with no visible change. Then 21.4 g. of a 43% dispersion of sodium in xylene were added dropwise, keeping the temperature below 50° C. The reaction evolved hydrogen and was strongly exothermic. The mixture was refluxed for approximately one hour and then transferred to a 300 ml. bomb in the absence of air, capped, and left overnight. The bomb was then purged with carbon monoxide to 900 p.s.i. and maintained at a temperature of 230° C. for one hour with rocking. The contents of the bomb were then removed and filtered with diatomaceous earth, and the residue taken up with petroleum ether. The product was crystallized and 8 g. of product recovered, which was identified as cyclopentadienylmanganese tricarbonyl.

*Example III*

One mole of cyclopentadiene (66.0 grams) was added to 1100 ml. of anhydrous ethylene glycol dimethyl ether containing two moles of sodium (46.0 grams) (43% dispersion in xylene). The temperature was held below 30° C. during the addition. To the resultant grey mixture was added one mole of previously dried manganous chloride (125.8 grams). The mixture darkened immediately. It was transferred to a three liter steel bomb which was purged with 1000 p.s.i. carbon monoxide. The carbon monoxide pressure was restored to 900 p.s.i. and the bomb was sealed. The pressure dropped to 780 p.s.i. before heat was applied. The bomb was heated to 250° C. for three to four hours. Upon cooling to room temperature the pressure was 450 p.s.i. It was estimated that 1.8 to 2.1 moles of carbon monoxide had reacted. The crude product was removed from the bomb and 70 grams of $(C_5H_5)Mn(CO)_3$ recovered from the liquid portion of the product.

*Example IV*

Fifteen and one-half gram-moles of sodium (43% dispersion in xylene) were added slowly to cyclopentadiene (10.0 gram-moles) in two gallons of ethylene glycol dimethyl ether. The resultant mixture was slowly added to manganous chloride (7.5 gram-moles) in one gallon of ethylene glycol dimethyl ether. The reaction mixture was transferred to an autoclave and pressurized with carbon monoxide to 850 p.s.i.g. The autoclave and contents were then heated to 200° C. and held at that temperature for one-half hour. During this heating period carbon monoxide was continually being absorbed, and it was necessary to repressurize at pressures of 850 to 1300 p.s.i.g. from time to time. After cooling, the crude product was removed from the autoclave and filtered. The filtrate was stripped of solvent. From the residue, 692 grams of $(C_5H_5)Mn(CO)_3$ were obtained by recrystallization from petroleum ether, a yield of 41% based on cyclopentadiene.

*Example V*

Sodium methylcyclopentadiene (1.0 gram-mole) was added to manganous bromide (1.0 gram-mole) in 500 ml. of ethylene glycol dimethyl ether at room temperature and stirred for two hours. The reaction mixture was then transferred to a 3000 ml. steel autoclave, containing one gram-mole of sodium (43% dispersion in xylene) and pressurized to 750 p.s.i.g. with carbon monoxide. It was heated to 225° C. and then allowed to cool to room temperature. The crude product was filtered and 36.6 grams of methylcyclopentadienyl manganese tricarbonyl recovered by distillation of the filtrate.

*Analysis.*—Found: Mn, 24.9; C, 49.5; H, 2.9. Theory for $MnC_9H_7O_3$: Mn, 25.2; C, 49.5; H, 3.2.

*Example VI*

Forty grams (0.32 mole) of carefully dried manganous chloride were added to about 200 ml. of anhydrous tetrahydrofuran. A large amount of heat was evolved and the mixture turned to a white gel-like mass. No pink manganous chloride remained. The white solid was identified as manganous chloride tetrahydrofuran etherate, $MnCl_2 \cdot C_4H_8O$. The manganous halide tetrahydrofuran etherate formed as above can be used in the production of a cyclopentadienylmanganese tricarbonyls in any of the process variations set forth in Examples I–V above.

*Example VII*

The following table presents the results of adding various amounts of cyclopentadienylmanganese tricarbonyl and methyl cyclopentadienylmanganese tricarbonyl to a standard 60 octane ASTM fuel mixture. The tests were conducted according to ASTM research octane rating method D–908–51.

| Additive | | Resulting Fuel Octane Number | | |
|---|---|---|---|---|
| Gms./400 ml. | Gms./Gal. | $C_5H_5Mn(CO)_3$ | No Additive | $CH_3C_5H_4Mn(CO)_3$ |
| 0 | 0 | | 60 | |
| 0.25 | 2.4 | 67.0 | | 62.9 |
| 0.50 | 4.7 | 72.3 | | 66.4 |
| 1.0 | 9.4 | 78.7 | | 72.4 |

What is claimed is:

1. The process for the preparation of a cyclopentadienylmanganese tricarbonyl which comprises reacting in an inert liquid organic solvent and in the substantial absence of cyclopentadiene and alkyl-substituted cyclopentadienes a manganous dihalide having a molecular weight greater than about 125 with an alkali metal, an alkali metal salt of at least one member selected from the group consisting of cyclopentadiene and alkyl-substituted cyclopentadiene, and carbon monoxide said alkali metal being present in an amount between about 0.25 and 1.0 mole per mole of said alkali metal salt and said alkali metal salt being present in an amount between about 1.0 and 1.75 moles per mole of said manganous dihalide, the sum of the number of moles of said alkali metal and the number of moles of said alkali metal salt being equal to about twice the number of moles of said manganous dihalide.

2. The process in accordance with claim 1 wherein the manganous dihalide is manganous dichloride.

3. The process in accordance with claim 1 wherein the manganous dihalide is manganous dibromide.

4. The process in accordance with claim 1 wherein the alkali metal is lithium.

5. The process in accordance with claim 1 wherein the alkali metal is sodium.

6. The process in accordance with claim 1 wherein the alkali metal is potassium.

7. The process in accordance with claim 1 wherein the alkali metal salt is the lithium salt.

8. The process in accordance with claim 1 wherein the alkali metal salt is the sodium salt.

9. The process in accordance with claim 1 wherein the alkali metal salt is the potassium salt.

10. The process in accordance with claim 1 wherein the solvent comprises at least one member selected from the group consisting of lower aliphatic cyclic ethers and lower alkylene glycol lower dialkyl ethers.

11. The process in accordance with claim 1, wherein said reaction is carried out at a temperature between about 50° C. and about 250° C. and said carbon monoxide is employed at a pressure between about 15 pounds per square inch gauge and about 5000 pounds per square inch gauge.

12. The process for the preparation of a cyclopentadienyl manganese tricarbonyl which comprises (1) mixing together separate suspensions consisting of (a) a manganous dihalide selected from the group consisting of manganous dichloride, manganous dibromide and manganous diiodide in an inert liquid organic solvent and (b) an alkali metal salt of at least one member selected from the group consisting of cyclopentadiene and alkyl-substituted cyclopentadiene in an inert liquid organic solvent and (2) reacting said mixture of suspensions (a) and (b) with an alkali metal and carbon monoxide, said alkali metal being present in an amount between about 0.25 and 1.0 mole per mole of said alkali metal salt and said alkali metal salt being present in an amount between about 1.0 and 1.75 moles per mole of said manganous dihalide, the sum of the number of moles of said alkali metal and the number of moles of said alkali metal salt being equal to about twice the number of moles of said manganous dihalide.

13. The process in accordance with claim 12 wherein said alkali metal salt is the sodium salt, said alkali metal is sodium and said solvent comprises at least one member selected from the group consisting of lower aliphatic cyclic ethers and lower alkylene glycol lower dialkyl ethers.

14. The process for the preparation of a cyclopentadienyl manganese tricarbonyl which comprises (1) mixing together separate suspensions consisting of (a) a manganous dihalide selected from the group consisting of manganous dichloride, manganous dibromide and manganous diiodide in an inert liquid organic solvent and (b) a mixture of an alkali metal and an alkali metal salt of at least one member selected from the group consisting of cyclopentadiene and alkyl-substituted cyclopentadiene in an inert liquid organic solvent, said alkali metal being present in an amount between about 0.25 and 1.0 mole per mole of said alkali metal salt and said alkali metal salt being present in an amount between about 1.0 and 1.75 moles per mole of said manganous dihalide, the sum of the number of moles of said alkali metal and the number of moles of said alkali metal salt being equal to about twice the number of moles of said manganous dihalide, and (2) reacting said mixture of suspensions (a) and (b) with carbon monoxide.

15. The process in accordance with claim 14 wherein said alkali metal salt is the sodium salt, said alkali metal is sodium and said solvent comprises at least one member selected from the group consisting of lower aliphatic cyclic ethers and lower alkylene glycol lower dialkyl ethers.

16. The process for the preparation of cyclopentadienyl manganese tricarbonyl which comprises (1) mixing together separate suspensions consisting of (a) a manganous dihalide selected from the group consisting of manganous dichloride, manganous dibromide and manganous diiodide in ethylene glycol dimethyl ether and (b) a mixture of sodium metal and cyclopentadienyl sodium in ethylene glycol dimethyl ether, said sodium metal being present in an amount between about 0.25 and 1.0 mole per mole of said cyclopentadienyl sodium and said cyclopentadienyl sodium being present in an amount between about 1.0 and 1.75 moles per mole of said manganous dihalide, the sum of the number of moles of said sodium metal and the number of moles of said cyclopentadienyl sodium being equal to about twice the number of moles of said manganous dihalide, and (2) reacting said mixture of suspensions (a) and (b) with carbon monoxide.

17. The process in accordance with claim 16 wherein said suspensions are formed in tetrahydrofuran.

18. The process in accordance with claim 16 wherein said manganous dihalide is manganous dichloride.

19. The process in accordance with claim 16 wherein said suspension of sodium metal and cyclopentadienyl sodium is added to said suspension of said manganous dihalide, said reaction with carbon monoxide is carried out at a temperature between about 150° C. and about 175° C., and said carbon monoxide is employed at a pressure between about 800 pounds per square inch gauge and about 1500 pounds per square inch gauge.

20. The process for the preparation of methyl cyclopentadienyl manganese tricarbonyl which comprises (1) mixing together separate suspensions consisting of (a) a manganous dihalide selected from the group consisting of manganous dichloride, manganous dibromide and manganous diiodide in ethylene glycol dimethyl ether and (b) a mixture of sodium metal and methylcyclopentadienyl sodium in ethylene glycol dimethyl ether, said sodium metal being present in an amount between about 0.25 and 1.0 mole per mole of said methylcyclopentadienyl sodium and said methylcyclopentadienyl sodium being present in an amount between about 1.0 and 1.75 moles per mole of said manganous dihalide, the sum of the number of moles of said sodium metal and the number of moles of said methylcyclopentadienyl sodium being equal to about twice the number of moles of said manganous dihalide, and (2) reacting said mixture of suspensions (a) and (b) with carbon monoxide.

21. The process in accordance with claim 20 wherein said suspensions are formed in tetrahydrofuran.

22. The process in accordance with claim 20 wherein said manganous dihalide is manganous dichloride.

23. The process in accordance with claim 20 wherein said suspension of sodium metal and methylcyclopentadienyl sodium is added to said suspension of said manganous dihalide, said reaction with carbon monoxide is carried out at a temperature between about 150° C. and about 175° C., and said carbon monoxide is employed at a pressure between about 800 pounds per square inch gauge and about 1500 pounds per square inch gauge.

References Cited in the file of this patent

UNITED STATES PATENTS

| | | |
|---|---|---|
| 2,818,416 | Brown et al. | Dec. 31, 1957 |
| 2,818,417 | Brown et al. | Dec. 31, 1957 |
| 2,868,816 | Petree | Jan. 13, 1959 |
| 2,898,354 | Shapiro et al. | Aug. 4, 1959 |
| 2,916,504 | Shapiro | Dec. 8, 1959 |

OTHER REFERENCES

Rheinboldt et al.: "J. Prackt. Chem.," 149, 30–54 (1937).